Sept. 18, 1951     C. W. BUCKLEY ET AL     2,568,382
METHOD AND APPARATUS FOR MAKING CONTAINERS
Filed June 14, 1946     9 Sheets-Sheet 1

Charles W. Buckley + Edgar P. Bailey
By Bacon + Thomas
Attorneys

Sept. 18, 1951  C. W. BUCKLEY ET AL  2,568,382
METHOD AND APPARATUS FOR MAKING CONTAINERS
Filed June 14, 1946  9 Sheets-Sheet 2

Inventors
Charles W. Buckley
Edgar P. Bailey
By Baron & Thomas
Attorneys

Sept. 18, 1951   C. W. BUCKLEY ET AL   2,568,382
METHOD AND APPARATUS FOR MAKING CONTAINERS
Filed June 14, 1946   9 Sheets-Sheet 3
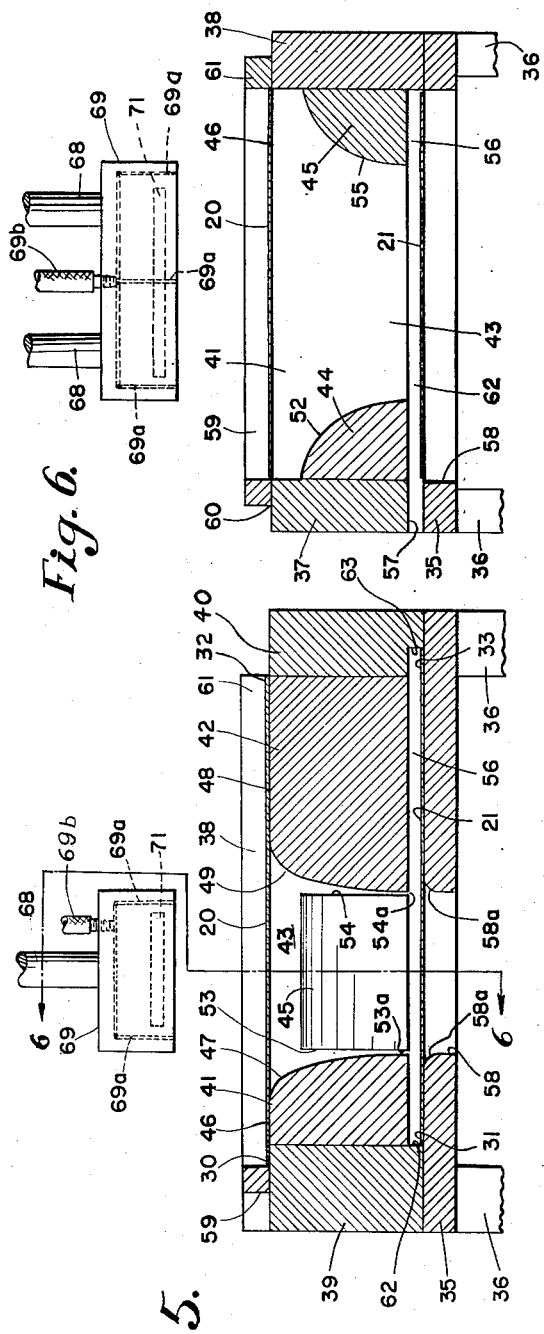
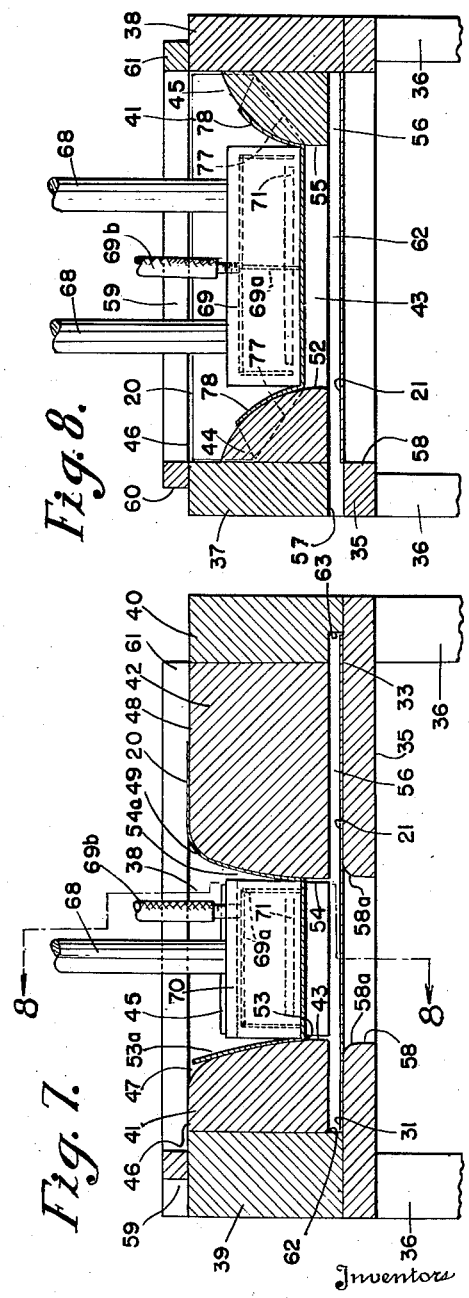
Inventors
Charles W. Buckley
Edgar P. Bailey
By Bacon + Thomas
Attorneys

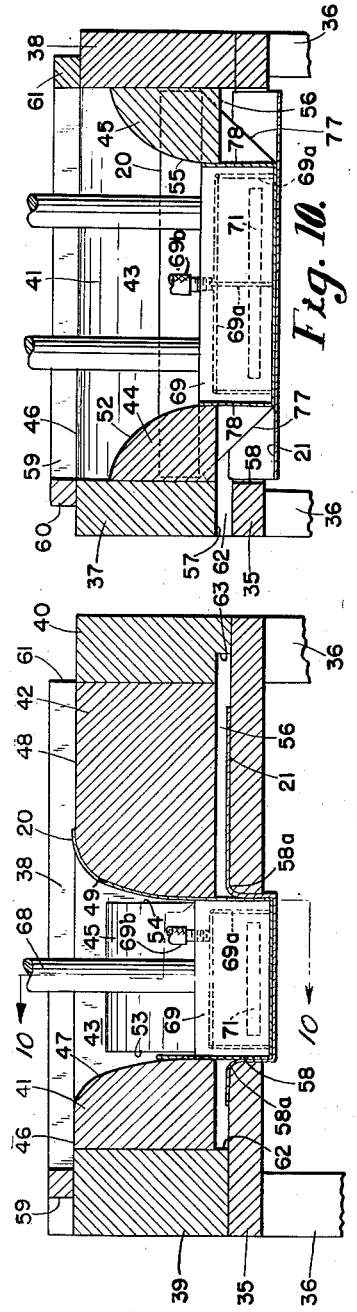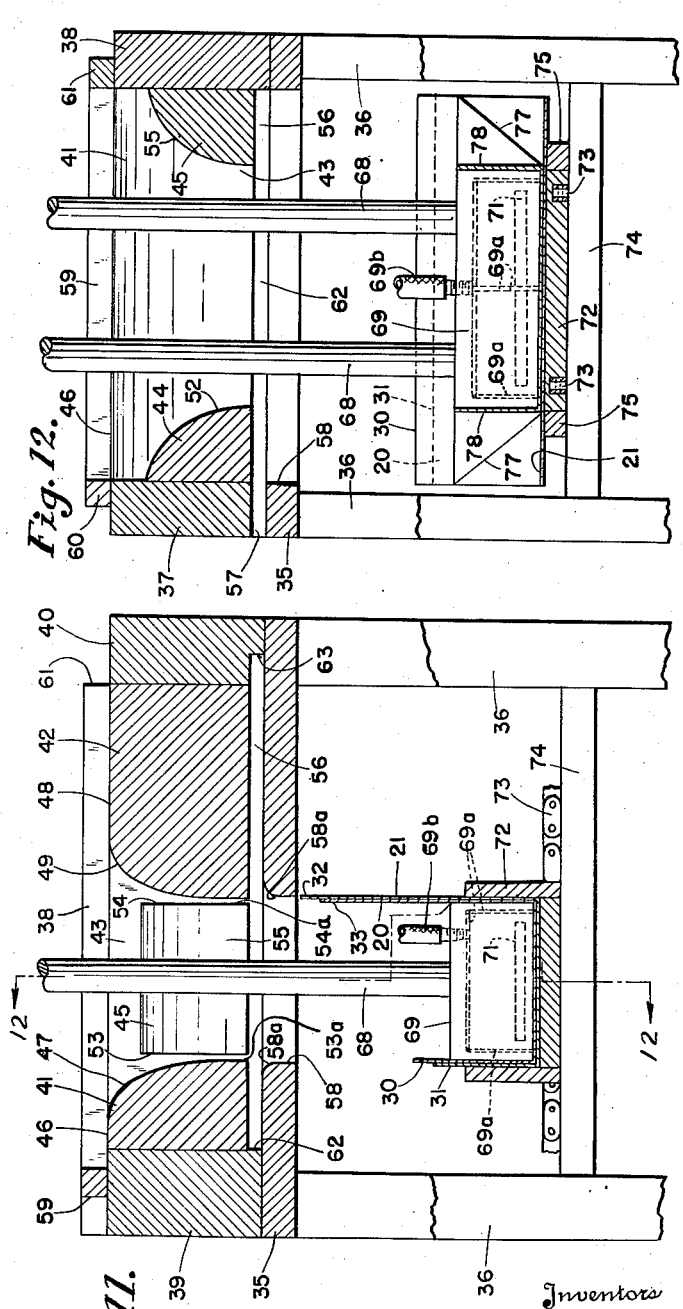

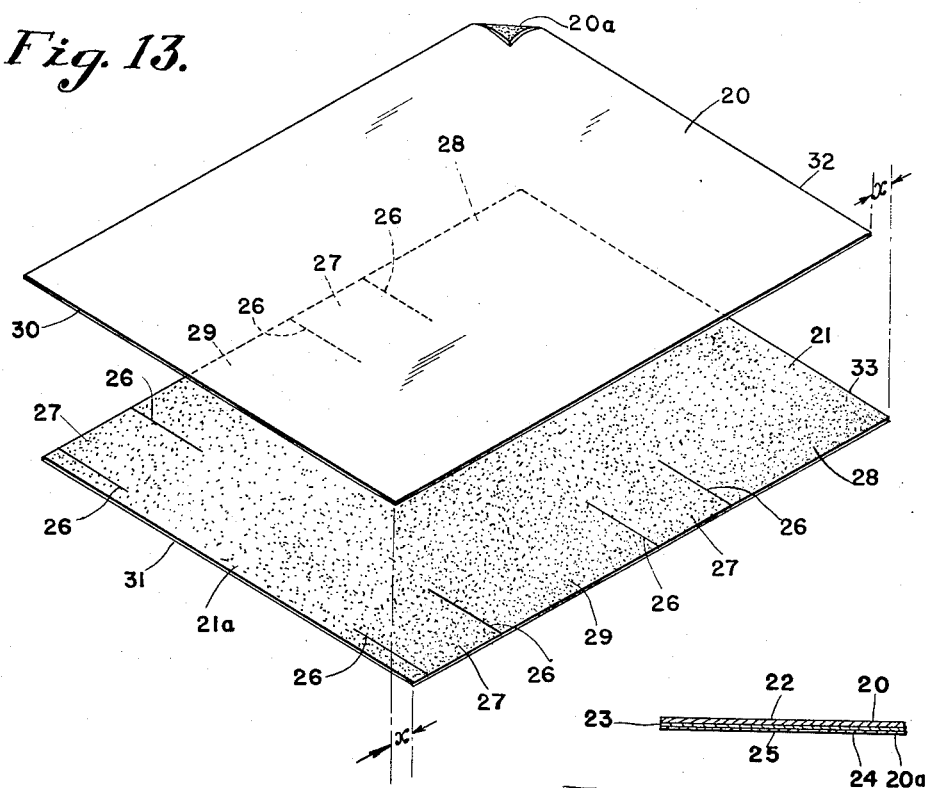
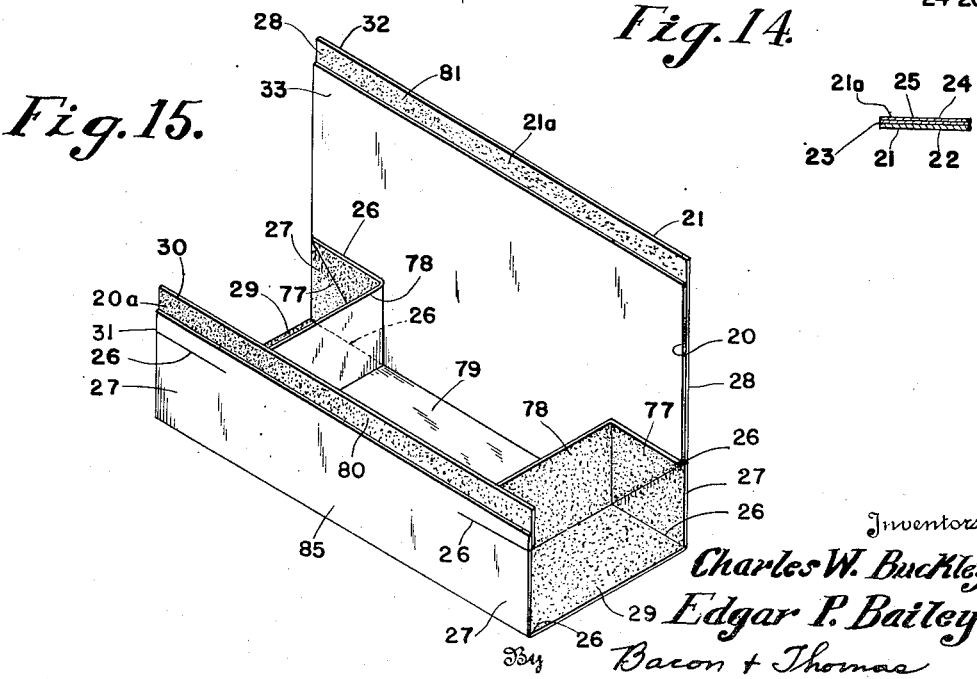

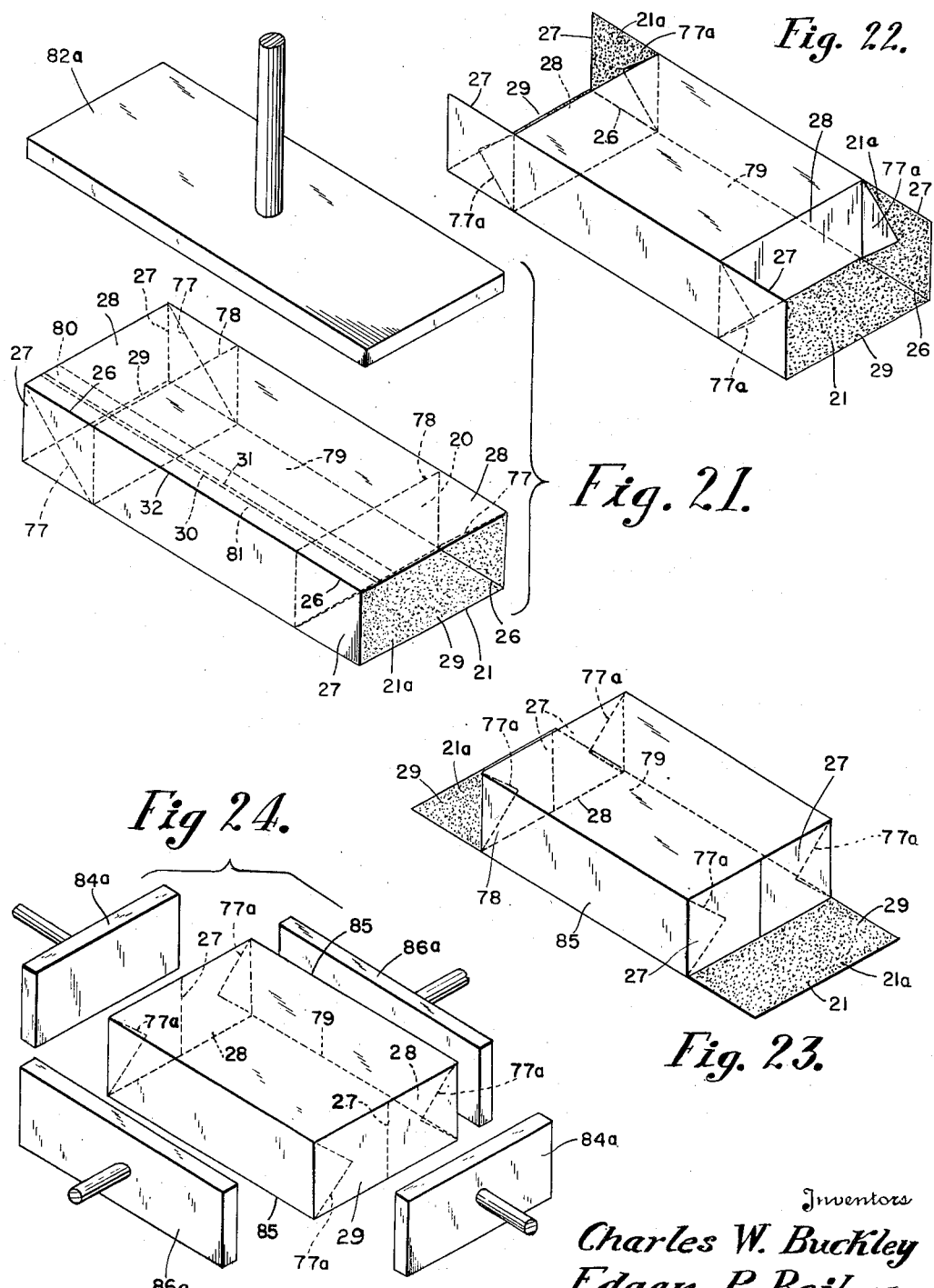

Sept. 18, 1951  C. W. BUCKLEY ET AL  2,568,382
METHOD AND APPARATUS FOR MAKING CONTAINERS
Filed June 14, 1946  9 Sheets-Sheet 7
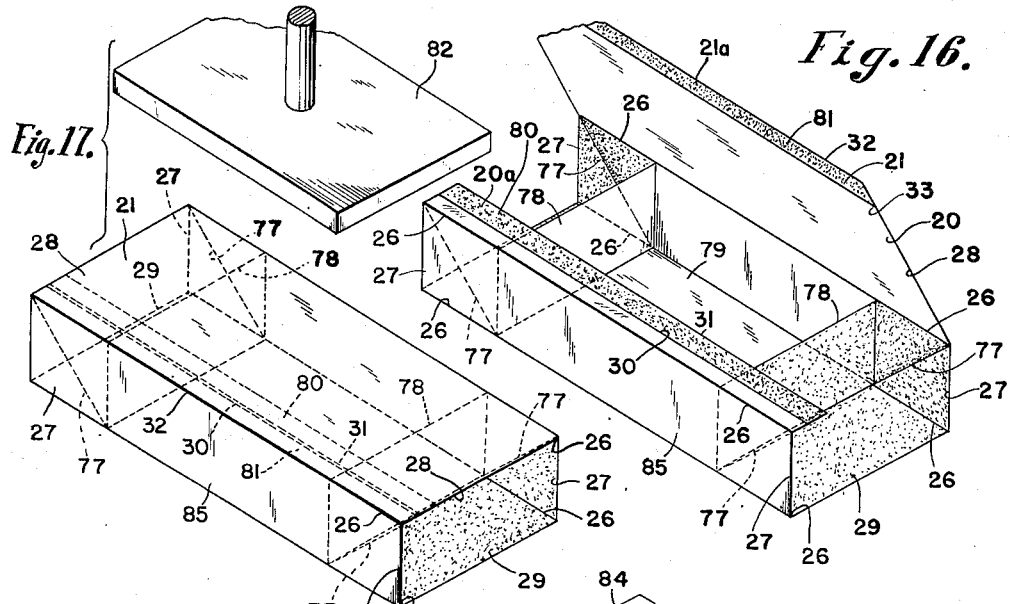
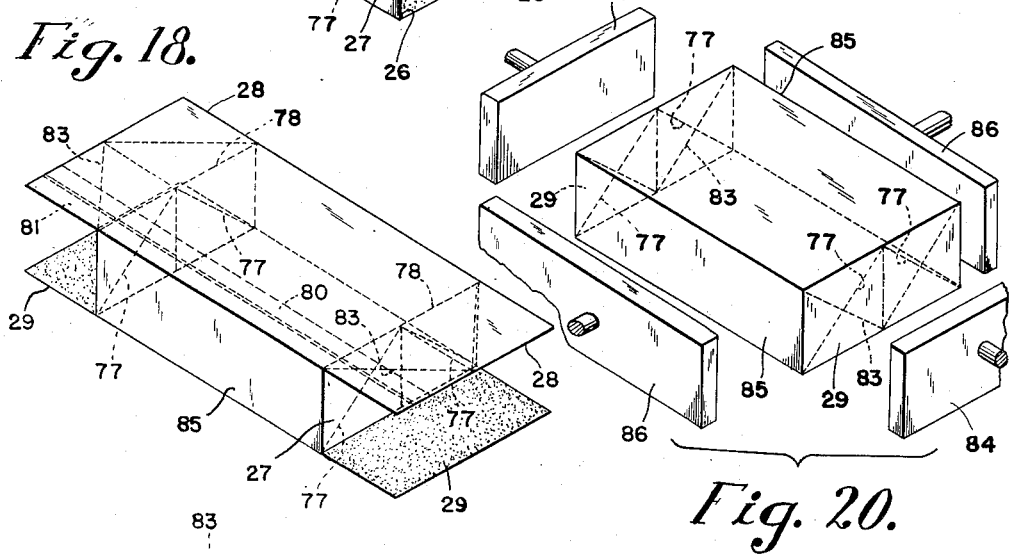
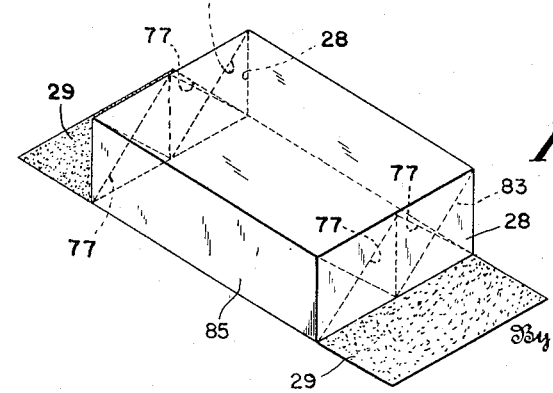
Inventors
Charles W. Buckley
Edgar P. Bailey
By Bacon + Thomas
Attorneys Sept. 18, 1951 C. W. BUCKLEY ET AL 2,568,382
METHOD AND APPARATUS FOR MAKING CONTAINERS
Filed June 14, 1946 9 Sheets-Sheet 8
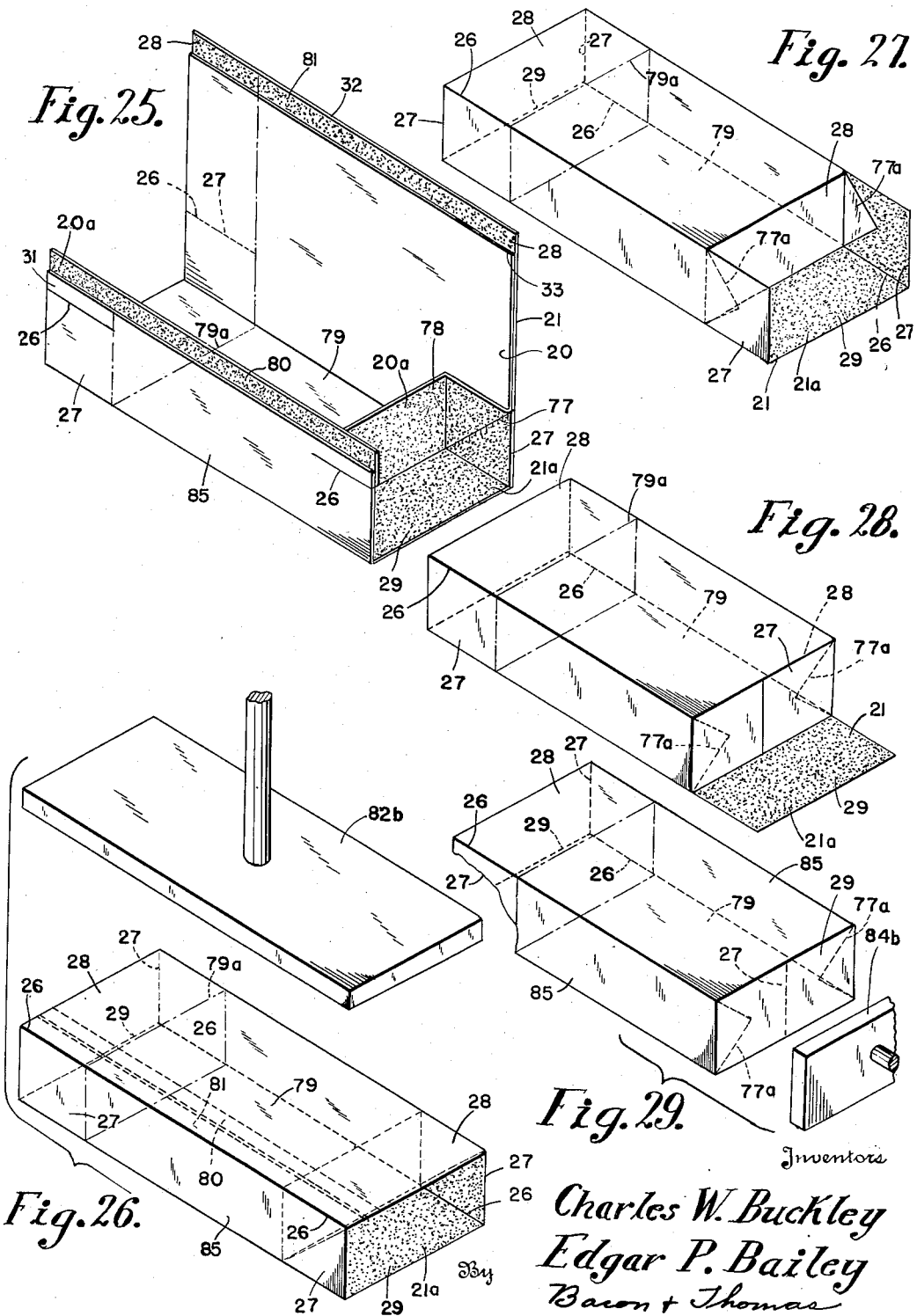
Inventors
Charles W. Buckley
Edgar P. Bailey
By Bacon + Thomas
Attorneys

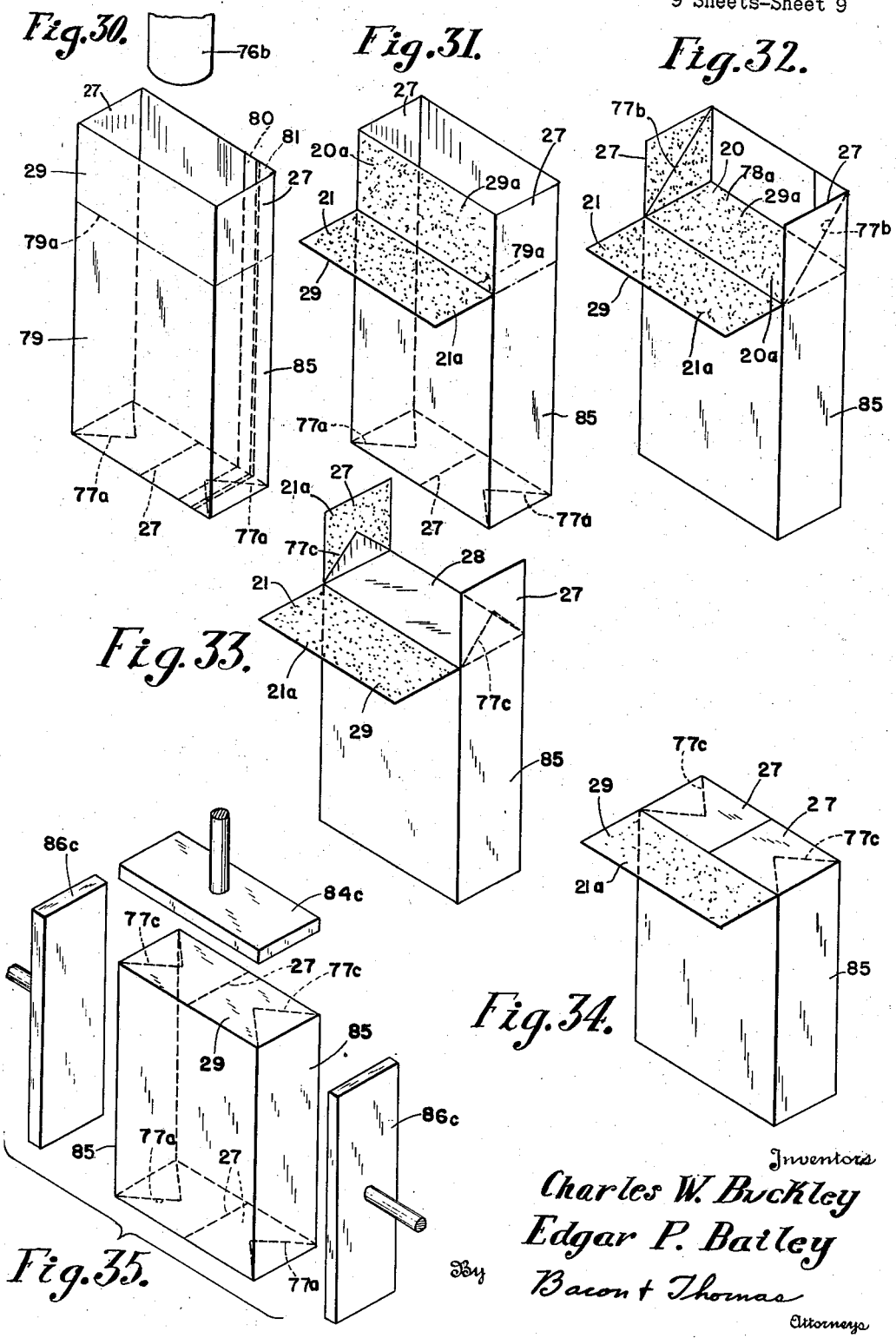
Sept. 18, 1951
C. W. BUCKLEY ET AL
2,568,382
METHOD AND APPARATUS FOR MAKING CONTAINERS
Filed June 14, 1946
9 Sheets-Sheet 9
Inventors
Charles W. Buckley
Edgar P. Bailey
By Bacon + Thomas
Attorneys Patented Sept. 18, 1951

2,568,382

UNITED STATES PATENT OFFICE 2,568,382

METHOD AND APPARATUS FOR MAKING CONTAINERS

Charles William Buckley and Edgar Paul Bailey, Durham, N. C., assignor to Wright Machinery Company, Durham, N. C., a corporation of North Carolina Application June 14, 1946, Serial No. 676,634

15 Claims. (Cl. 93—51)

The present invention relates to a new container or package construction and to a novel method and apparatus for making the same.

More specifically, the invention relates to a package constructed from a plurality of sheets of paper and/or metal foil material, laminated and partially folded to provide a container adapted to be filled with a food product or other material, and then further folded to final form. The container is subjected to various heat-sealing operations during its fabrication so that the finished package is completely hermetically sealed.

In general, the present invention comprises a container made of two sheets of readily foldable material, the sheets per se being either single ply or laminated, but in any event having adhesive material therebetween, or having one side thereof provided with an adhesive material, and preferably an adhesive material which will produce a hermetic seal upon being subjected to heat.

In carrying out the principles of the invention, one of the sheets is slitted to provide opposed pairs of wide and narrow flaps, which serve as end closures for the container, and the two sheets are arranged with their adhesive sides back to back, or in confronting relation to each other, with the longitudinal edges of the sheets coinciding but with their ends preferably longitudinally offset, so that in effect one sheet is longitudinally staggered with respect to the other. The thus offset sheets are disposed in vertically spaced relation with the slitted sheet lowermost and apparatus including side and end fold-forming dies is provided for effecting partial folding of the upper or inner sheet into a general U-shape to provide a wide or bottom wall and narrow side walls having extensions for forming a wide wall or top closure for the container, and for further folding said upper sheet to provide end walls for the container and triangular tucks connecting said end walls and side walls, prior to engagement of the upper sheet with the lower or outer sheet, which, in turn, is partially folded into a U-shape about the inner sheet to provide a double thickness for the various walls of the container, the two sheets being positively bonded together at this time in the area constituting said wide or bottom wall of the container by a heated plunger employed to assist in effecting the aforementioned partial folding of the two sheets. The container at this stage is shallow and horizontally disposed and, if desired, the commodity to be packaged may now be introduced through its wide, open upper end. After the container has been filled, the extensions of the side walls are folded over in partially overlapping relation upon the end walls to provide a top closure, and portions of the sheets at the opposite ends of the container are then simultaneously folded in a given order (by only three additional folding operations) to provide end closures for the container. A modified construction contemplates leaving one end of the container open so that it can be filled in an upright position to adapt the same for packaging granular materials which would "pyramid" too high for proper closing of the shallow horizontally disposed container. As will be explained in detail later, all of the surfaces of the container are, at one time or another, subjected to heat, so that the two sheets are permanently bonded together throughout the contacting areas thereof to laminate the same and provide a completely hermetically sealed package.

The principal object of the invention is to provide a container structure which can be easily and cheaply made and which at the same time is completely hermetically sealed to render the same impervious to moisture, odors, etc.

Another object of the invention is to provide a container that can be made from sheet material and folded, filled, and hermetically sealed by a minimum number of operations.

A still further object of the invention is to provide a method and suitable apparatus whereby the aforedescribed container can be successfully made.

Other objects and features of the invention will be apparent from the following description taken in conjunction with the accompanying drawings, in which:

Fig. 5 is a sectional view taken on the line 5—5 of Fig. 3 diagrammatically illustrating the inner and outer sheets supported in longitudinally offset relation prior to folding thereof;

Fig. 6 is a sectional view taken on the line 6—6 of Fig. 5;

Fig. 7 is a diagrammatic view similar to Fig. 5 but showing the inner sheet in a partially folded condition;

Fig. 8 is a sectional view taken on the line 8—8 of Fig. 7;

Fig. 9 is a diagrammatic view illustrating the outer sheet partially folded about the inner sheet;

Fig. 10 is a sectional view taken on the line 10—10 of Fig. 9;

Fig. 11 is a diagrammatic view illustrating the partially folded inner and outer sheets clear of the folding apparatus and deposited in a receiving box;

Fig. 12 is a sectional view taken on the line 12—12 of Fig. 11;

Fig. 13 is a diagrammatic perspective view illustrating the manner in which the inner and outer sheets are positioned in vertically spaced and longitudinally offset relation by the apparatus shown in Figs. 1 to 4;

Fig. 14 is an exaggerated sectional view through the inner and outer sheets illustrating a possible laminated construction of the individual sheets;

Fig. 15 is a perspective view of the partially folded container as it appears at the completion of the folding operations performed by the apparatus shown in Figs. 1 to 4, inclusive;

Fig. 16 is a diagrammatic perspective view showing an extended portion of one of the side walls fully folded over onto the end walls and an extended portion of the other side wall partially folded over to ultimately provide a top closure for the container;

Fig. 17 is a diagrammatic perspective view showing the side wall extensions overlapped adjacent one edge of the container together with heated plate means for hermetically sealing the inner and outer sheets to complete the top closure for the container;

Fig. 18 is a diagrammatic perspective view showing the next step in the process of folding the container in which the side flaps at the respective ends of the container are simultaneously folded inwardly;

Figure 2:
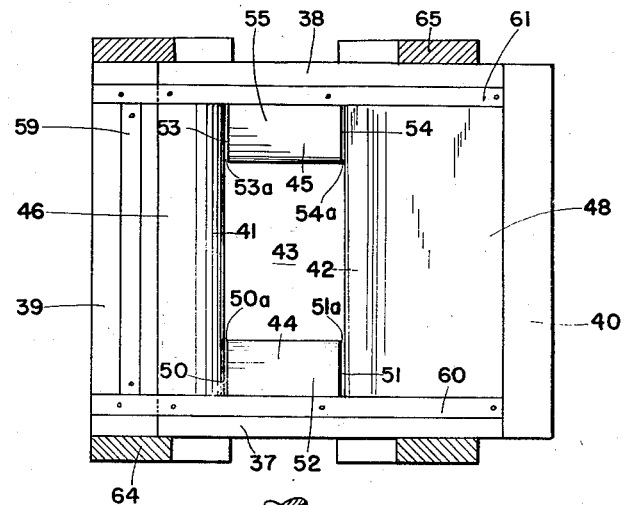
Fig. 2 is a sectional plan view taken on the line 2—2 of Fig. 1 and particularly illustrating the relative position of the dies for forming the side and end folds in the inner sheet.

Fig. 19 is a diagrammatic perspective view illustrating the next step of the process in which the top end flaps of the outer sheet and underlying triangular flaps of the inner sheet are simultaneously folded down upon the side flaps; and Fig. 20 is a diagrammatic perspective view illustrating the final folding step of the process in which the bottom end flaps are folded upwardly upon the top end flaps, heated plate means also being shown for effecting heat-sealing of the ends and sides of the container.

Figs. 21-24, inclusive, illustrate the successive steps of a modified method for folding sheet material to provide a container of the general character illustrated in Figs. 13-20, inclusive, but mainly differing therefrom with respect to the order of the steps of folding and heat-sealing the end flaps to form end closures for the container;

Figs. 25-35, inclusive, illustrate the steps of a further modified method of folding sheet material to provide a hermetically sealable container adapted to be filled by introducing material through a small end thereof; Figs. 25-29, inclusive, illustrating the successive steps in folding the container and closing and hermetically sealing one end thereof while the container is in a horizontal position, and Figs. 30-35, inclusive, illustrating the successive steps of filling the container and closing and heat-sealing the opposite end thereof while said container is in a vertical position.

Referring first to Fig. 13, the two sheets from which the present container is formed are generally identified by the numerals 20 and 21. The sheet 20 forms the inner sheet or lining of the container and the sheet 21 forms the outer sheet or wrapper of the container and may have any suitable printed matter (not shown) on the lower side thereof. The lower side of the sheet 20 and the upper side of the sheet 21, as viewed in Fig. 13, may be provided with a coating 20ª and 21ª, respectively, of any suitable thermoplastic adhesive material, such as wax, lacquer, resin, etc.

Any suitable material may be employed for the inner sheet 20 and the outer sheet 21. Actually, and preferably, the sheets 20 and 21 are themselves laminated, as diagrammatically illustrated in Fig. 14, and may include a very thin layer of aluminum or other suitable metal foil 22 of a thickness of about .00035 inch adhesively bonded to a layer of tissue or bond paper 23, weighing 10 to 30 lbs. to the ream, and a second layer of paper 24, preferably porous tissue, weighing about 8 lbs. to a ream. The sheet 23 is adhesively bonded to the foil 22 throughout its area and the porous sheet 24 is impregnated with ordinary petroleum wax 25 (serving in this example as the adhesive 20ª and 21ª) and bonded to the sheet 23 throughout its area. Thus, the sheets 20 and 21, even when individually laminated as above, are quite thin and can be readily folded. It will be understood, of course, that the invention is not limited to the use of any particular material or materials, inasmuch as the inner and outer sheets 20 and 21 can obviously be made of a single ply paper or single ply metal foil of suitable thickness, or multiple plies of paper and/or metal foil or other materials, the important factor, in any case, being that the confronting faces of the sheets 20 and 21 carry the adhesive material 20ª and 21ª, respectively, thereon which will bond the sheets together to effect complete hermetic sealing of the package made therefrom. Accordingly, it will be understood that the term "inner sheet" as used herein embraces either a single or multiple ply sheet of any suitable material or materials and that the same definition is to be given to the term "outer sheet."

The inner sheet 20 is of a predetermined length and width, which may be varied in accordance with requirements, to provide a container of the desired size. The inner sheet 20 is plain in the sense that it is devoid of all slits. On the other hand, the outer sheet 21 is of the same length and width as the inner sheet 20, but is provided with a total of eight transverse slits, four transverse slits 26 extending inwardly a predetermined distance from each longitudinal edge of the outer sheet 21 to produce portions that provide side flaps 27, top end flaps 28 and bottom end flaps 29.

The apparatus shown in Figs. 1 to 4, inclusive, is adapted to receive and support the sheets 20 and 21 with their longitudinal edges coinciding but with their transverse edges offset to the extent indicated by the dimension X in Fig. 13, it being noted from the latter figure that the leading end 30 of the inner sheet 20 is in advance of the corresponding end 31 of the sheet 21 and that the trailing end 32 of the sheet 20 is also in advance of the corresponding end 33 of the sheet 21.

The apparatus shown in Figs. 1 to 4, inclusive, comprises a horizontal platform 35 mounted upon a plurality of upright legs 36. The platform 35 supports a frame comprising side members 37 and 38, and end members 39 and 40, suitably interconnected and mounted thereon. Side-fold-forming dies 41 and 42 are disposed in spaced substantially parallel relation between the side members 37 and 38 and are suitably connected to the end members 39 and 40 to provide a fold-forming pocket 43 therebetween. An end-fold-forming die 44 is disposed in the pocket 43 between the side-fold dies 41 and 42 and is suitably secured to the side member 37. A second end fold die 45 is similarly disposed in the pocket 43 between the side fold dies 41 and 42, and is suitably secured to the side members 38.

Figure 3:
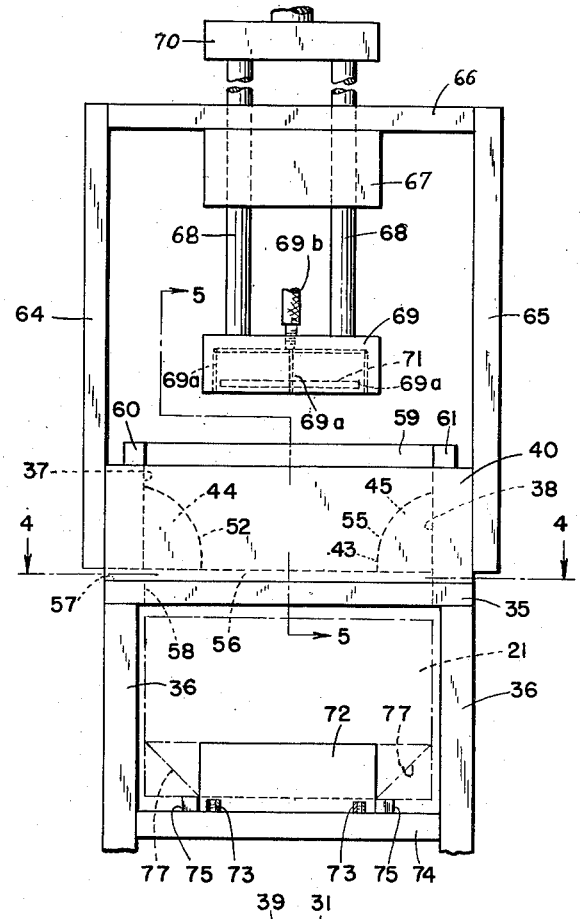
Fig. 3 is a right end elevational view of the apparatus shown in Fig. 1.

The side-fold die 41 includes a substantially flat top portion 46 and a curved and inwardly inclined portion 47 defining one side of the pocket 43. The side-fold die 42 has a flat top surface 48 and a similarly contoured curved and inclined portion 49 defining the opposite side of the pocket 43. The end fold dies 44 and 45 have the uppermost portions thereof disposed a substantial distance below the plane of the surfaces 46 and 48 of the side fold dies 41 and 42. The end fold die 44 includes vertical end faces 50 and 51, which confront the contoured faces 47 and 49, of the side-fold dies 41 and 42, and are slightly spaced therefrom to provide tuck forming slots 50ª and 51ª constituting relatively narrow extensions of the pocket 43. A surface 52 on the end die 44 is curved inwardly and downwardly, as best shown in Figs. 3 and 6, for example, and defines one end wall of the pocket 43. The other end fold die 45 is similarly provided with vertical end faces 53 and 54 providing tuck forming slots 53ª and 54ª extending outwardly from the pocket 43, and a downwardly and inwardly curved surface 55 defining the opposite end wall of the pocket 43.

Figure 4:
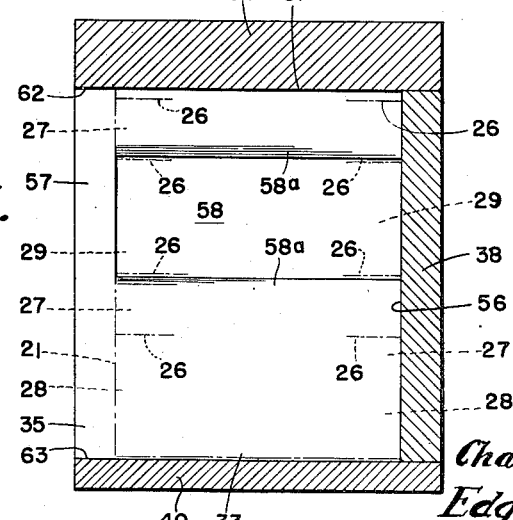
Fig. 4 is a sectional plan view taken on the line 4—4 of Fig. 3 and particularly illustrating the manner in which the outer sheet is indexed with respect to an opening in the platform supporting the same.

The lower faces of the dies 41, 42, 44 and 45 are disposed in a plane spaced above the top surface of the platform 35 to provide a recess 56 for the reception of the outer slitted sheet 21, the sheet 21 assuming the position in the recess shown in dot-and-dash lines in Fig. 4. The lower edge of the side member 37, in the zone of the recess 56, terminates in spaced relation to the platform 35 to provide an entrance opening 57 through which the sheet 21 is inserted for positioning upon the platform 35. The platform 35 has a rectangular opening 58 vertically aligned with the pocket 43 and the longitudinal edges of said opening are preferably rounded as indicated at 58ª. The length of the opening 58 is equal to the width of the sheet 21, as will be apparent from Fig. 4. It will also be apparent that the slits 26 defining the bottom end flaps 29 coincide with the lines defining the longitudinal walls of the opening 58, but have been shown inwardly thereof in the interest of clarity.

Figure 1:
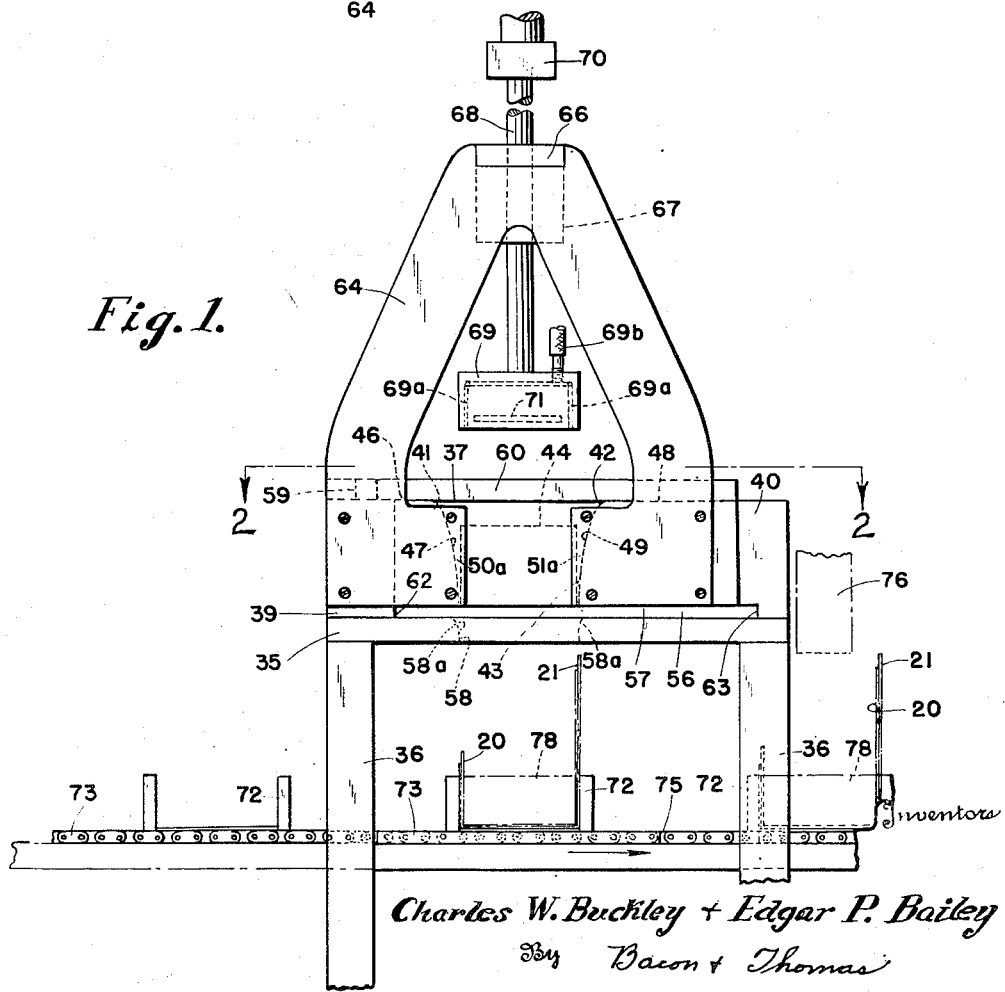
Fig. 1 is an elevational view somewhat diagrammatically illustrating suitable apparatus for effecting the initial partial folding and heat sealing of the container.

The inner sheet 20 may be supplied from a roll of material (not shown) and cut to a predetermined length and fed to the apparatus shown in Figs. 1 to 3 by any suitable mechanism (not shown) and positioned upon the surfaces 46 and 48 of the side wall dies 41 and 42 to assume the position best indicated in Figs. 5 and 6. The sheet 20, it will be observed, is longitudinally indexed in predetermined relation to the pocket 43 by a transverse stop strip 59 secured to the end member 39 and adapted to be engaged by the end 30 of said sheet. The sheet 20 is transversely indexed relative to the pocket 43 by guide strips 60 and 61 adapted to cooperate with the longitudinal edges of said sheet, the guide strips 60 and 61 being mounted upon the side members 37 and 38. It will be noted from Fig. 5 that the pocket 43 is disposed closer to the end 30 of the sheet 20 than to the end 32 of said sheet, in order to provide side wall extensions of different vertical height in the partially folded container, as will be pointed out later.

The outer sheet 21 is indexed relative to the inner sheet 20 and with respect to the opening 58 in the platform 35 by the engagement of one of its longitudinal edges with the inner surface of the side member 38, as indicated in Figs. 4 and 6 and by the cooperation of walls 62 and 63 at the ends of the recess 56 with the ends 31 and 33, respectively, of said sheet. It will be understood that the outer sheet 21 may also be cut from a roll and provided with the slits 26 and automatically fed into the opening 57 communicating with the recess 56, by any suitable or conventional mechanism (not shown). As will be seen from Figs. 3 and 5, the end wall 62 of the recess 56 is disposed farthur toward the right than the stop strip 51, and hence, the sheets 20 and 21 are thus automatically disposed in the predetermined longitudinal offset relation diagrammatically illustrated in Fig. 13.

Referring to Figs. 1 to 3, the side member 37 has an upright frame member 64 mounted thereon and the side member 38 has a similar frame member 65 mounted thereon. The frame members 64 and 65 support a transverse member 66 having a block 67 secured to the lower side thereof. The transverse member 66 and the block 67 serve as a guide for rods 68 having a plunger 69 secured to the lower ends thereof. The upper ends of the rods 68 are connected to a crosshead 70 adapted to be reciprocated by a hydraulic cylinder or other means (not shown). The plunger 69 is provided with conventional or suitable heating means 71 and passages 69ª opening at the lower face of said plunger and communicating with a conduit 69ᵇ connected with a source of air under pressure (not shown).

It will be observed from Figs. 1 and 3 that the plunger 69 is vertically aligned with the pocket 43 and the opening 58 so that it can move therethrough upon reciprocation of the crosshead 70. Channel-shaped receiving boxes or receptacles 72 are adapted to be intermittently moved into vertical registration with the pocket 43 and opening 58 by suitable conveyor means 73. The receiving boxes 72 are preferably supported by a plate 74 while in the indexed position in order to retain the same in a fixed horizontal plane. The plate 74 is supported by the legs 36 and carries guides 75 (Figs. 1 and 12) engaging the opposite ends of the receiving boxes 72. The receiving boxes 72 are adapted to successively receive the partially folded container to convey the same to an automatic filling station diagrammatically indicated at 76 (Fig. 1) and to thereafter convey the same relative to suitable folding fingers and plates (not shown) for completing the folding of the container.

Let it be assumed that the sheet 20 has been positioned upon the side fold dies 41 and 42 in proper indexed relation with the fold-forming pocket 43 and that the plunger 69 is moving downwardly. The lower face of the plunger 69 will contact the upper surface of the sheet 20 and start to move the same into the pocket 43. At such time, the portion of the sheet 20 engaged by the plunger 69 will then be deflected out of the plane of the supporting surfaces 46 and 48 of the side fold dies 41 and 42 for the full transverse width of said sheets, such deflection being made possible by the fact that the end fold dies 45 and 46 have the uppermost portion thereof spaced a substantial distance below the plane of the supporting surfaces 46 and 48, the object of such arrangement being to facilitate folding thereof to form tucks, described below. Continued downward movement of the plunger 69 will cause the sheet 20 to be forced deeper into the pocket 43 between the side fold dies 41 and 42, with the result that said sheet assumes a general U-shape, with the portions of said sheet outwardly of the sides of said plunger taking a general curvature corresponding to that of the surfaces 47 and 49 of said side fold dies, as shown in Figs. 7 and 8. Simultaneously, the portions of the sheet 20 beyond the ends of the plunger 69 and directly overlying the end fold dies 44 and 45 are caused to be folded upwardly around the ends of the plunger 69 and the portions of said sheet adjacent thereto are moved through the tuck forming slots 50ᵃ—51ᵃ and 53ᵃ—54ᵃ to thereby form a pair of tucks 77, and an end wall 78 for the container at each end of the plunger 69, the tucks 77 connecting the end walls 78 with generally upright extensions of the side wall portions of the container.

Continued downward movement of the plunger 69 will bring the thus partially folded sheet 20 into engagement with the sheet 21 and force both sheets downwardly through the opening 58 in the platform 35, as diagrammatically illustrated in Figs. 9 and 10. The heated plunger 69, while in contact with the sheet 20, will have caused the adhesive 20ᵃ on the side of said sheet remote from said plunger to become partially melted or tacky so that upon engagement thereof with the sheet 21, the contacting portions of the two sheets will adhere to each other and form a laminated bottom 79 for the container. Hence, no relative slipping of one sheet with respect to the other occurs while the plunger is forcing both sheets through the opening 58 and folding the outer sheet 21 into a substantially U-shape about the inner sheet 20. Further movement of the plunger 69 to the end of its stroke will deposit the sheets 20 and 21 (in their completed U-shape) in the box 72, as diagrammatically illustrated in Figs. 11 and 12.

It will be particularly noted from Figs. 11 and 12 that the initial offsetting of the ends of the sheets 20 and 21 has resulted in the end 30 of the sheet 20 extending vertically higher than the end 31 of the sheet 21, and in the end 33 of the sheet 21 extending to a greater height vertically than the end 32 of the sheet 20. Thus, a strip 80 of the adhesive 20ᵃ on the inner sheet 20 and a strip 81 of the adhesive 21ᵃ on the outer sheet 21 are left exposed, as is best shown in Fig. 15.

Considering Fig. 15 in further detail, it will be observed that the narrow side flaps 27 are in the same horizontal plane as the tucks 77 and that the wide flaps 29 form a continuation of the bottom wall 79 and are aligned with the end walls 78, but extend at right angles with respect thereto. It will be further noted that the wide flaps 28 are now upright and extend above the tucks 77.

The plunger 69, heated by the means 71, effects positive hermetic sealing of the sheets 20 and 21 throughout an area corresponding to that of the lower face of said plunger to provide a laminated bottom wall 79 for the container, the two sheets being pressed together against the bottom of the box 72 when the said plunger reaches the end of its downstroke. The plunger 69 is then withdrawn while air under suitable pressure is fed through the passages 69ᵃ in said plunger from the supply conduit 69ᵇ, under the control of suitable means (not shown), said air escaping at the lower face of said plunger into the partially folded container to strip the same from said plunger and facilitate retention thereof in the box or receptacle 72. The partially folded container then remains within the box 72 for conveyance to a position under the filling station 76 previously referred to. The particular formation of the upwardly opening triangular tucks 77 prevents loss of any juice or other liquid that may have been introduced into the container at the filling station 76.

After the container has been filled, the end portions 30 and 31 are folded inwardly onto the upper edge of the end walls 78 and the end portions 32 and 33 are also folded over upon the end walls 78 and in overlapping relation with the ends 30 and 31, as will be understood from Figs. 16 and 17, by any suitable folding mechanism (not shown). The adhesive strip 81 then overlies the end 30 and the end 33 overlies the adhesive strip 80. Heat is then applied to the top closure for the container, thus formed, by a heated plate 82, which hermetically seals the sheets 20 and 21 throughout the area thereof disposed between the sides 85 of the container and the end walls 78. The container is now hermetically sealed at the top and bottom thereof and has the configuration illustrated in Fig. 17, wherefrom it will be noted that the top end flaps 28 are now in confronting relation with the bottom end flaps 29, and that the end 33 of the outer sheet 21 is now disposed along one longitudinal edge or corner of the container.

Fig. 18 illustrates the next step in the folding process, wherein the side flaps 27 at the opposite ends of the container are simultaneously folded inwardly by any suitable means (not shown), bringing the tucks 77 into engagement with the outer surface of the end walls 78 and causing the portions of the inner sheet 20 disposed below the top flaps 28 to assume a generally triangular shape, as indicated at 83. The flaps 27 are not only brought into intimate engagement with the outer surface of the tucks 77 but also the portion of the end walls 78 not covered by the tucks 77. Thereafter, the top flaps 28 and the underlying triangular portions 83 are simultaneously folded downwardly over the side flaps 27, as indicated in Fig. 19, and the bottom flaps 29 are then simultaneously folded upwardly upon the top flaps 28, as indicated in Fig. 18, by any suitable means (not shown) to complete the folding operations. The end walls 78, tucks 77, side flaps 27, top flaps 28, triangular portions 83 and bottom flaps 29 at the opposite ends of the container are all heat-sealed together by heated plates 84, and at the same time, if desired, the sides 85 of the carton are heat-sealed to join the sheets 20 and 21 together in these regions by heated plates 86. Thus, it becomes apparent that the two sheets 20 and 21 will now have been hermetically sealed together throughout their areas to provide a package construction which is completely hermetically sealed to prevent moisture either being absorbed by the material in the container, or the loss of moisture from the container to the atmosphere. It will also be apparent that the aforedescribed method of folding the container results in a substantially uniform distribution of the container material.

Figs. 21 to 24, inclusive, illustrate a modified method for heat-sealing the top and for folding and heat-sealing the end flaps of the container previously described.

Referring now to Fig. 21, the container illustrated is at the same folding stage of the cycle shown in Fig. 17, but a relatively longer, conventional heating plate 82a is shown for effecting heat-sealing of the overlapped portions 80 and 81 of the sheets 20 and 21 throughout the length of said overlapped portions, it being recalled that in Fig. 17 the overlapped portions 80 and 81 of the sheets 20 and 21 are heat-sealed only in the area between the end walls 78. Of course, the portions of the sheets 20 and 21 forming the bottom 79 of the container are bonded together in the area lying between the end walls 78, as in Fig. 16.

Fig. 22 illustrates a modified step in the folding of the container wherein, instead of next folding the side flaps 27 inwardly as shown in Fig. 18, the wide top flaps 28 at the opposite ends of the container are simultaneously folded downwardly against the end walls 78, thereby reducing the triangular tucks 77 to relatively small triangular tabs 77a, it being understood that one of the tabs 77a is disposed inwardly of each of the four narrow side flaps 27. The adhesive side 20a of the end wall 78 is engaged by the portion of the sheet 20 disposed inwardly of the flaps 28 so that a good bond can be effected throughout the area thereof.

Fig. 23 illustrates the next step in the modified folding process wherein the narrow end flaps 27 and the triangular tabs 77a at each end of the container are simultaneously folded inwardly against the outer surface of the flaps 28. It will be noted that the adhesive material 21a on the narrow side flaps 27 will then contact the adjacent surface of the triangular tabs 77a and the outer surface of the wide top flaps 28 so that upon subsequent application of heat a hermetic seal is formed therebetween.

Fig. 24 illustrates the final folding step of the modified method in which the wide flaps 29 at the opposite ends of the container are folded upwardly against the outer surface of the narrow flaps 27. Here again, it will be observed that in folding the flaps 29 from the position shown in Fig. 23 to that shown in Fig. 24, the adhesive surface 21a of the flaps 29 is brought into contact with the outer surface of the narrow flaps 27, so that upon subsequent application of heat the flaps 29 are hermetically sealed to the flaps 27.

In Fig. 24, conventional heating elements 84a are provided to hermetically seal the end wall 78, the wide top flap 28, the tabs 77a, the narrow side flaps 27, and the wide bottom flap 29 together, so as to form a unitary end wall structure. This end wall has been found to be absolutely liquid-tight. Conventional heating elements 86a are provided to effect heat-sealing of the laminated sheet portions forming the side walls 85 of the container. Hence, all portions of the laminated material comprising the container are hermetically sealed together throughout the areas thereof in the completed container.

Figs. 25 to 35, inclusive, illustrate a modified method of making a container especially adapted for vertical filling through one small end thereof, instead of being filled through a wide top when in a horizontal position as in Figs. 1 and 15. The advantage of such container is that it eliminates all objectionable piling or "pyramiding" of certain materials (during the filling operation) to a height which would interfere with the proper folding of the container material to complete the package. Hence, the modified container is better adapted for packaging certain granular materials than the containers previously described, although all embody the advantages of complete hermetic sealing.

Fig. 25 illustrates a stage in the folding of the container corresponding to that shown in Fig. 15, except that the inner sheet 20 has been shown folded at only one side thereof to form one end wall 78, instead of two. It will be understood, of course, that the portions of the sheets 20 and 21 lying between the dot-and-dash line 79a and the wall 78 and forming the base portion 79 of the container have been bonded together or heat-sealed by the piston 69, the same as in Fig. 15. The extended portions of the side walls of the container shown in Fig. 25 are then folded over into overlapping relation as indicated in Fig. 26, and the entire area of the sheets 20 and 21 including the flap portions 28 and the underlying portions of the inner sheet 20 are hermetically sealed together by a conventional heating element 82b, the same as in Fig. 21. The next three steps in the folding cycle of the container are the same as shown in Figs. 22, 23 and 24, except that only the flaps at one end of the container are folded to form an end closure. Thus, in Fig. 27, one of the wide end flaps 28 is shown folded down upon the adhesive side of the end wall 78 and transforms the triangular tucks 77 into the relatively small triangular tabs 77a. In Fig. 28, the narrow side flaps 27 and the tabs 77a are shown as they appear when folded over upon the wide flaps 28; and in Fig. 29, the other wide flap 29 is shown folded over upon the narrow flaps 27. The overlapped flaps thus folded are hermetically sealed together by a conventional heating element 84b. Hence, at this stage of the folding cycle, the laminated sheets 20 and 21 comprising the container are hermetically sealed at the two wide sides and the flaps 28 forming extensions of one of said wide sides and at one end of the container.

Fig. 30 shows the partially folded and heat-sealed container of Fig. 29 in an upright position beneath a filling spout 76b to provide for filling of the container through the small upper, open end thereof. The object of filling the container while in an upright position rather than while in a horizontal position as shown in Fig. 1, affords the advantage of precluding "pyramiding" of certain granular materials from interfering with the subsequent folding operations to effect complete closure of the container, as previously pointed out.

Assuming that the desired quantity of material has been introduced into the container shown in Fig. 31 through the spout 76, the next step in the folding operation consists in folding back the wide flap portion 29 of the outer sheet 21 along the line 79a and leaving the corresponding flap portion, identified as 29a, of the inner non-slitted sheet 20 in its upright position. Fig. 32 illustrates the next folding step in which the portion 29a is folded inwardly to form an end wall 78a corresponding to the end wall 78 of Fig. 25, and forming triangular tucks 77b, corresponding to the triangular tucks 77, disposed inwardly of the narrow flaps 27. The next step in the folding operation is illustrated in Fig. 33 which shows the wide flap portion 28 of the outer sheet 21 and the underlying portion of the inner sheet 20 folded inwardly upon the end wall 78a, thereby converting the triangular tucks 77b into triangular tabs 77ᶜ. It will be noted from Fig. 33, that a substantial area of the adhesive material 21ᵃ on the narrow flaps 27 is now exposed.

The next step in the folding operation is shown in Fig. 34 wherein the narrow flaps 27 and the triangular tabs 77ᶜ are folded downwardly upon the wide flap 28. The final step in the folding of the end closure for the upper end of the container is illustrated in Fig. 35, in which the wide flap 29 is shown folded over upon the narrow flaps 27, with the inner adhesive surface 21ᵃ thereof contacting the outer surface of said side flaps. Fig. 35 further illustrates a conventional heat-sealing element 84ᶜ for effecting hermetic sealing of the various flaps forming the closure for the top of the container, and conventional heating elements 86ᶜ for effecting heat-sealing of the laminated material forming the side portions 85 of the container. With these final heat-sealing operations, all portions of the laminated material comprising the container will have been hermetically sealed together throughout the areas thereof to form a completely moisture and waterproof container.

It will be understood that various changes may be made in the details of construction of the apparatus disclosed herein for effecting folding of the inner and outer sheets 20 and 21, respectively, and that the order of folding the side, top and bottom end flaps may be varied without departing from the spirit of the invention or the scope of the annexed claims.

We claim:

1. The method of making a container, comprising the steps of. folding a sheet into a substantially U-shaped configuration to provide a bottom wall and side walls including extensions for forming top closure means for the container; folding the portions of said sheet at the base of the U to provide upright end walls extending substantially perpendicularly to said base and to provide outwardly extending tucks joining said end walls and said side walls; and folding the portions of said side walls that extend above said end walls over upon the upper edges of said end walls and in overlapping relation with each other to form a top closure for the container; folding said tucks inwardly against said end walls; and folding the portions of said top closure disposed outwardly of said end walls downwardly relative to said tucks.

2. The method of making a laminated container, comprising the steps of: providing two sheets of foldable material; slitting one of said sheets inwardly from its longitudinal edges to provide a series of flaps adapted to form side flaps, top end flaps and bottom end flaps for the container; positioning said sheets in vertically spaced relation; folding the upper of said sheets into a substantially U-shaped configuration and folding the edge portions of said sheet at the base of said U upwardly to provide end walls extending substantially perpendicularly to said base and to the sides of said U and to provide outwardly extending tucks joining said end walls with said side walls of said U; engaging the thus folded upper sheet with the lower sheet; and folding said lower sheet in nested U-shaped relation about said upper sheet.

3. The method of making a laminated container, comprising the steps of: providing two sheets of foldable material having adhesive material on one side thereof; slitting one of said sheets inwardly from its longitudinal edges to provide a series of flaps adapted to form side flaps, top end flaps and bottom end flaps for the container; positioning said sheets in vertically spaced relation with the adhesive sides thereof confronting each other; folding the upper of said sheets into a substantially U-shaped configuration and folding the edge portions of said sheet at the base of said U upwardly to provide end walls extending substantially perpendicularly to said base and to the sides of said U and to provide outwardly extending tucks joining said end walls with said side walls of said U; engaging the thus folded upper sheet with the lower sheet; folding said lower sheet in nested U-shaped relation about said upper sheet; and effecting bonding of said sheets together in at least the area at the base of the U.

4. The method of making a laminated container, comprising the steps of: providing two sheets of foldable material having adhesive material on one side thereof; slitting one of said sheets inwardly from its longitudinal edges to provide a series of flaps adapted to form side flaps, top end flaps and bottom end flaps for the container; positioning said sheets in vertically spaced relation with the adhesive sides thereof confronting each other and with the ends of said sheets offset longitudinally with respect to each other; folding the upper of said sheets into a substantially U-shaped configuration to provide a bottom wall, side walls, and extensions of said sides adapted to form a top closure for the container; folding the edge portions of said upper sheet at the ends of said bottom wall upwardly to provide end walls extending substantially perpendicularly to said bottom wall and to said side walls and to provide outwardly extending tucks joining said end walls with said side walls; engaging the thus folded upper sheet with the lower sheet and folding said lower sheet in nested U-shaped relation about said upper sheet; effecting bonding of said sheets together in at least the area of said bottom wall; folding the portions of said sheets which extend above said end walls over upon the upper edges of said end walls in overlapping relation with each other to form a top closure for the container; bonding the overlapped portions of the top closure together; folding said tucks, side flaps, top end flaps and bottom end flaps inwardly with respect to said end walls; bonding the end walls and flaps together; and bonding the portions of the sheets forming the side walls of the container to each other.

5. The method of making a laminated container, comprising the steps of: providing a first sheet of foldable material having an adhesive on one side thereof; providing a second sheet of foldable material of substantially the same length and width as said first sheet and also having adhesive material at one side thereof; slitting said second sheet inwardly from its longitudinal edges to provide flaps adapted to serve as side, and top and bottom end flaps for the container; positioning said first and second sheets in vertically spaced relation with the adhesive sides thereof back to back and with the longitudinal edges of said sheets in vertical alignment but with the ends of said sheets offset longitudinally with respect to each other; folding said first sheet into a substantially U-shaped configuration to provide a horizontally extending portion adapted to serve as a bottom wall for the container and upright portions extending upwardly from said bottom wall and adapted to serve as the sides and top closure for the container; folding portions of said bottom wall at the longitudinal edges of said first sheet upwardly to provide end walls for the container extending substantially perpendicularly with respect to said bottom portion of said first sheet and to provide substantially triangular tucks interconnecting said end walls with said upright portions; engaging the thus folded first sheet with said relatively offset second sheet; folding said second sheet in nested U-shaped relation with said first sheet so as to provide a second bottom wall engaging the bottom wall of said first sheet and upright portions extending upwardly from said second bottom wall, with one of said upright portions terminating lower than the corresponding upright wall of said first sheet and with the other upright portion terminating at a point above the corresponding upright portion of said first sheet; folding the portions of said first and second sheets that extend above said end walls, over upon the upper edges of said end walls and in overlapping relation with each other to form a top closure for the container; bonding the overlying portions of said top closure together; folding said tucks of said first sheet and the side flaps of said second sheet inwardly against said end walls of said first sheet; folding said top end flaps of said second sheet and the underlying portions of said first sheet downwardly upon said side flaps; folding said bottom end flaps of said second sheet upwardly upon said top end flaps; bonding said end walls and said overlapped flaps together; and bonding together the portions of said first and second sheet forming the side walls of said container.

6. Container folding apparatus, comprising: means for folding a first sheet into substantially U-shape form to provide a bottom wall for the container and side walls extending upwardly from said bottom wall and for further folding said first sheet to provide end walls for the container extending upwardly from said bottom wall and connected by tucks with said side walls; and means for effecting folding of a second sheet into substantially U-shape form about said first sheet to provide another lamination for said bottom and side walls of said container.

7. Container folding apparatus, comprising: means for folding a first sheet into substantially U-shape form to provide a bottom wall for the container and side walls extending upwardly from said bottom wall and for further folding said first sheet to provide end walls for the container extending upwardly from said bottom wall and connected by tucks with said side walls; means for effecting folding of a second sheet into substantially U-shape form about said first sheet to provide another lamination for said bottom and side walls of said container; and means for effecting bonding of said two bottom walls together.

8. Container folding apparatus, comprising: means for folding a first sheet into substantially U-shape form to provide a bottom wall and side walls for the container extending upwardly from said bottom wall and for further folding said first sheet to provide end walls for the container extending upwardly from said bottom wall and connected by tucks with said side walls; means for effecting folding of a second sheet into substantially U-shape form to provide another lamination for said bottom and side walls of the container; and means arranged to receive and convey the thus folded sheets.

9. Container folding apparatus, comprising: a frame carrying fold-forming dies arranged to provide a fold-forming pocket; indexing means for positioning a sheet having an adhesive on the underside thereof in predetermined relation to the dies of said fold-forming pocket; means providing a recess longitudinally offset with respect to said indexing means and adapted to receive a sheet of foldable material having adhesive on the upper side thereof to position said sheet in predetermined indexed relation with respect to said first sheet, said last-mentioned means having an opening below said recess aligned with said fold-forming pocket; and means for effecting movement of said first sheet through said fold-forming pocket into engagement with said second sheet and for moving both sheets through said opening and for hermetically sealing the contacting surfaces of said sheets together in the zone thereof registering with said fold-forming pocket.

10. Container folding apparatus, comprising: means providing a support for a first sheet of foldable material and providing a fold-forming pocket below said first sheet; a plunger for moving said first sheet into and through said fold-forming pocket, said fold-forming pocket including surfaces arranged and contoured to cooperate with said plunger to effect folding of said first sheet to provide a horizontal bottom portion for the container and side wall portions extending upwardly from said bottom portion and to effect folding of the outermost regions of said bottom portion to provide substantially upright end walls for the container disposed between said side walls and to further provide tucks joining said end walls and side walls; and means supporting a second sheet of foldable material below said fold-forming pocket and in longitudinally offset relation with respect to said first sheet, said last-mentioned means having an opening vertically aligned with said fold-forming pocket, and said plunger also being movable through said opening to move said first and second sheets therethrough to effect folding of said second sheet about the bottom and sides of said first sheet.

11. Container folding apparatus, comprising: a frame; folding dies carried by said frame including a pair of side fold dies arranged in spaced, substantially parallel relation and a pair of end fold dies arranged in spaced substantially parallel relation but disposed between said side fold dies, the confronting faces of said dies being curved downwardly and inwardly to provide a fold-forming pocket having downwardly converging walls, the ends of said end fold dies being spaced from the adjacent faces of said side fold dies to provide narrow tuck forming slots; means for positioning a first foldable sheet above said fold-forming pocket and in predetermined relation thereto; a platform disposed below said fold dies for supporting a second foldable sheet, said platform having an opening vertically aligned with said fold-forming pocket; plunger means for moving said first sheet through said fold-forming pocket to effect folding of said first sheet to provide a horizontal bottom portion for the container and side wall portions extending upwardly from said bottom portion and to effect folding of the outermost regions of said bottom portion to provide substantially upright end walls for the container disposed between said side walls and to form tucks joining said end and side walls, and to simultaneously move both of said sheets through said opening in said platform to effect folding of said second sheet about the bottom and sides of said first sheet but in longitudinally offset relation thereto.

12. The method of making a laminated container, comprising the steps of: providing two sheets of foldable material and forming four slits in one of said sheets extending inwardly from one of its longitudinal edges to provide a pair of opposed narrow flaps and a pair of opposed relatively wide flaps for the container; folding the non-slitted sheet into a substantially U-shaped configuration and folding the edge portion thereof at the base of said U to provide at least one end wall extending substantially perpendicularly to said base and to the sides of said U and to provide outwardly extending triangular tucks joining said end wall with said side walls of said U; engaging the thus folded non-slitted sheet with said slitted sheet and folding both of said sheets to provide a substantially rectangular tube; folding one of said wide flaps and the underlying portion of said non-slitted sheet over upon said end wall and transforming said triangular tucks into generally triangular tabs; folding said triangular tabs and said narrow flaps over upon said one wide flap; and folding the other of said wide flaps over upon said narrow flaps.

13. The method of making a laminated container, comprising the steps of: providing two sheets of foldable material and forming four slits in one of said sheets extending inwardly from both of its longitudinal edges to provide a pair of opposed narrow flaps and a pair of opposed relatively wide flaps for the container; folding the non-slitted sheet into a substantially U-shaped configuration and folding the edge portion thereof at the base of said U to provide one end wall extending substantially perpendicularly to said base and to the sides of said U and to provide outwardly extending triangular tucks joining said end wall with said side walls of said U; engaging the thus folded non-slitted sheet with said slitted sheet and folding both of said sheets to provide a substantially rectangular tube; folding one of said wide flaps and the underlying portion of said non-slitted sheet over upon said end wall and transforming said triangular tucks into generally triangular tabs; folding said triangular tabs and said narrow flaps over upon said one wide flap; folding the other of said wide flaps over upon said narrow flaps; moving the thus folded container from a horizontal to an upright position with the upper end thereof uppermost; filling said container through its open upper end; folding one of said wide flaps at the upper end of said container outwardly to leave the underlying portion of the non-slitted sheet exposed; folding said exposed portion of said non-slitted sheet inwardly to provide a top wall for said container and simultaneously forming triangular tucks in said non-slitted sheet extending upwardly from said top wall adjacent said narrow flaps; folding the other of said wide flaps over upon said top wall and transforming said triangular tucks into relatively small triangular tabs; folding said narrow flaps and said triangular tabs over upon said other wide flap; and folding said one wide flap over upon said narrow flaps.

14. The method of making a container, comprising the steps of: providing two sheets of foldable material; slitting one of said sheets inwardly from its longitudinal edge to provide a pair of narrow flaps and a pair of relatively wide flaps adapted to form an end closure for the container; folding said sheets into substantially U-shaped configuration with the slitted sheet outermost and folding the edge portion of the inner sheet at one side thereof at the base of said U to provide an end wall extending substantially perpendicularly to the base and to the sides of said U and to provide triangular tucks joining said end wall with said side walls of said U disposed adjacent said narrow flaps; folding the portions of said side walls which extend above said end wall over upon the upper edge of said end wall in overlapping relation with each other to form a closure at one side of the container; bonding the thus overlapped portions of the container together throughout the length thereof; folding one of said wide flaps over upon said end wall and converting said triangular tucks into relatively small triangular tabs; folding said narrow flaps and triangular tabs over upon said one wide flap; and folding the other of said wide flaps over upon said narrow flaps.

15. Container folding apparatus, comprising: a frame carrying fold-forming dies arranged to provide a fold-forming pocket; indexing means for positioning a sheet in predetermined relation to the dies of said fold-forming pocket; means providing a recess longitudinally offset with respect to said indexing means and adapted to receive a sheet of foldable material to position said sheet in predetermined indexed relation with respect to said first sheet, said last-mentioned means having an opening below said recess aligned with said fold-forming pocket; and means for effecting movement of said first sheet through said fold-forming pocket into engagement with said second sheet and for moving both sheets through said opening.

CHARLES WILLIAM BUCKLEY.
EDGAR PAUL BAILEY.

REFERENCES CITED

The following references are of record in the file of this patent:

UNITED STATES PATENTS

| Number | Name | Date |
|---|---|---|
| 515,121 | Hunt | Feb. 20, 1894 |
| 695,273 | Birnie | Mar. 11, 1902 |
| 954,739 | Joplin | Apr. 12, 1910 |
| 1,062,002 | Harbeck | May 20, 1913 |
| 1,425,004 | Orstrom | Aug. 8, 1922 |
| 1,908,823 | Daniell | May 16, 1933 |
| 1,957,957 | Hartmann | May 8, 1934 |
| 2,100,739 | Gilfillan | Nov. 30, 1937 |
| 2,135,409 | Munn et al. | Nov. 1, 1938 |
| 2,239,398 | Palmer | Apr. 22, 1941 |
| 2,257,433 | Stokes | Sept. 30, 1941 |
| 2,387,272 | Kline | Oct. 23, 1945 |
| 2,407,802 | Stotter | Sept. 17, 1946 |
| 2,430,459 | Farrel | Nov. 11, 1947 |

FOREIGN PATENTS

| Number | Country | Date |
|---|---|---|
| 760,477 | France | Dec. 14, 1933 |
| 654,136 | Germany | Dec. 14, 1937 |
| 39,491 | Norway | Jan. 19, 1922 |